United States Patent [19]

Mennigmann

[11] Patent Number: 4,856,556
[45] Date of Patent: Aug. 15, 1989

[54] WATER MIXING VALVE, ESPECIALLY FOR A SANITARY FIXTURE

[75] Inventor: Kurt Mennigmann, Fröndenberg, Fed. Rep. of Germany

[73] Assignee: Friedrich Grohe Armaturenfabrik GmbH & Co., Hemer, Fed. Rep. of Germany

[21] Appl. No.: 272,532

[22] Filed: Nov. 16, 1988

[30] Foreign Application Priority Data

Nov. 16, 1987 [DE] Fed. Rep. of Germany ....... 3738854

[51] Int. Cl.⁴ ........................................... F16K 11/078
[52] U.S. Cl. .............................. 137/625.4; 137/625.17; 251/368
[58] Field of Search .................. 137/625.4, 625.17; 251/368

[56] References Cited

U.S. PATENT DOCUMENTS

| | | | |
|---|---|---|---|
| 4,610,268 | 9/1986 | Knapp | 137/625.4 X |
| 4,621,659 | 11/1986 | Pawelzik | 137/625.4 X |

FOREIGN PATENT DOCUMENTS

| | | | |
|---|---|---|---|
| 75323 | 3/1983 | European Pat. Off. | 137/625.4 |
| 3339464 | 3/1977 | Fed. Rep. of Germany | |
| 3211619 | 10/1983 | Fed. Rep. of Germany | 137/625.4 |

Primary Examiner—Arnold Rosenthal
Attorney, Agent, or Firm—Herbert Dubno

[57] ABSTRACT

The water mixing valve is provided with a housing insertable in a sanitary fixture. The housing is made of a cuplike casing and a base member having a plurality of throughgoing water passages. The mixing valve has a valve seat disk held fixed in the cuplike casing and a control disk movable with an operating member. A sealing member made of elastic rubber material is positioned in each of the water passages for sealing the valve seat disk and the sanitary fixture. To simplify the sealing member construction and particularly their mounting in the mixing valve each of the sealing members is undetachably attached in the vicinity of the opening in the wall of the base member for one of the water passages.

5 Claims, 2 Drawing Sheets

WATER MIXING VALVE, ESPECIALLY FOR A SANITARY FIXTURE

FIELD OF THE INVENTION

My present invention relates to a mixing valve and, more particularly, to a water mixing valve for a sanitary fixture.

BACKGROUND OF THE INVENTION

A water mixing valve with a special housing or formed as a cartridge insertable in a sanitary fixture is known (see German Patent Document DE-OS 33 39 464). The special housing comprises a cuplike casing and a base member having a plurality of water passages.

This mixing valve has at least one valve seat disk held substantially fixed therein and a control disk movable with the help of an operating member mounted on the valve seat disk.

Sealing members made from a flexible rubber material are provided in the water passages for sealing between the valve seat disk and the sanitary fixture.

In this mixing valve, moreover the hose-like sealing members are positioned loosely in a base member between the valve seat disk and the sanitary fixture. For reliable mounting and support a supporting ring is also provided on the inside wall of the sealing member.

The sealing action between the valve seat disk and the sanitary fixture is satisfactorily provided with this sealing arrangement. However it is necessary to make the sealing member and the supporting ring separately and they must each be separately inserted in the base member. Furthermore it is difficult and expensive to bring the individual parts into a properly sealed configuration in mounting the valve cartridge in the sanitary fixture and/or to prevent slippage of the seal.

OBJECT OF THE INVENTION

It is an object of my invention to simplify and ease the mounting of the sealing members in the above-described water mixing valve.

Another object of the invention is to provide an improved cartridge-type valve free from the aforementioned drawbacks.

SUMMARY OF THE INVENTION

These objects and others which will become more readily apparent hereinafter are attained in accordance with my invention in a water mixing valve as described in the background section above.

According to my invention tubular sealing members are undetachably affixed to the base member in the vicinity of the wall of the openings to the water passages.

The sealing members and the base member can be attached by vulcanization.

The sealing member can have peripheral flanges for mounting on opposite sides to the base member. Advantageously the wall in the base member can have a peripheral dovetail shape for holding the sealing member.

The hose-like sealing member can have a constricted portion approximately ⅓ the maximum thickness of the sealing member in the vicinity of the wall of the base member.

Advantageously the flanges joining the sealing member to the base member are sunk in the base member on the opposite sides of the base member.

With the invention the multiplicity of individual parts, namely the base member and the three sealing members for the three water passages with their associated supporting rings can be combined into one single part.

Furthermore the supporting rings can be completely dispensed with. The supervision on the completeness of the installation of the cartridge or special housing in the sanitary fixture can be eliminated. Sealing problems due to slippage of the sealing members in their mounting can no longer occur as easily. Finally the bursting pressure limit can be raised by the structure according to my invention since the sealing members are held optimally in the base member. By contrast, the prior art apparatus with individual loose sealing members would be completely closed in the face of string water pressure because these loose members would tend to slide under the plastic base.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
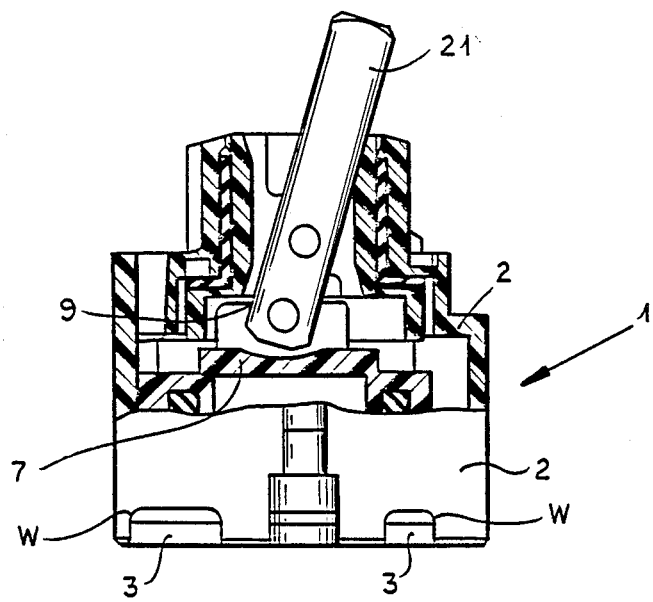
FIG. 1 is a partially cross sectional side view of a water mixing valve according to my invention mounted in a housing.
Figure 2:
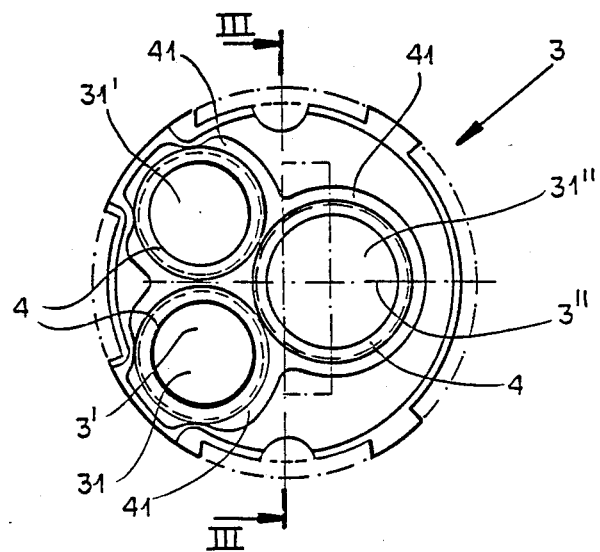
FIG. 2 is a bottom plan view of the mixing valve of FIG. 1 with a base member.
Figure 3:
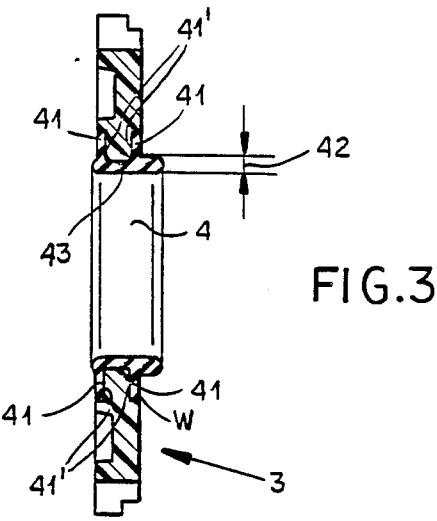
FIG. 3 is a section taken along line III—III of FIG. 2.

The water mixing valve illustrated in FIGS. 1 to 3 and is mounted in a housing 1 which can be part of a cartridge fitting into the valve housing of a suitably designed sanitary fixture which has not been completely illustrated (see the aforementioned German application). The cartridge housing 1 is formed from a shaped casing 2 and a base member 3. A locally-fixed valve ceramic seat disk 23 is mounted in the housing 1.

A control disk 7 is movable with an operating member 21 connected at 9 to the control disk 7.

As described in the German application, the control disk 7 has a ceramic portion 22 resting against the stationary disk 23. A passage for cold water and for warm water and an outlet for mixed water are provided in the valve seat disk 23. With the help of a chamber 24 formed in the control disk 7 these passages can be brought into a more or less overlapped relationship depending on the position of the control disk 33 and thus the flow rate and the mixing ratio of the cold and warm water are determined as described in the German reference.

The base member 3 of the housing 1 is inserted in the valve seat disk 7 and has suitable openings 31, 31', 31" for respective water passages for cold, warm and mixed in the faucet assembly. Hose-like tubular sealing members 4 are located in the openings 31, 31', 31" and are inserted in the bottom facing end of the base member 3 and thus make a tight connection between the throughgoing water passages of the valve seat disk 23 and the outlet and/or entrance in the sanitary fixture after mounting the water mixing valve cartridge in the sanitary fixture.

The sealing members 4 are undetachably attached in one piece with the base member 3 by vulcanization. The hose-like main part of the sealing member 4 is provided in the vicinity of the wall w of the base member 3 with a constricted portion 43 of about ⅓ the thickness of the sealing member 4.

Thus a good seal can be made at the base member 3 so that a satisfactory performance can be maintained by the hose-like structure of the sealing member 4.

In the embodiment shown in FIG. 3 peripheral flanges 41 are received in depressions 41' on the opposite sides of the base member 3 for attachment of the sealing member 4 to the base member 3. This allows a reinforcement of the connection of the sealing member 4 with the base member 3 as is apparent especially from FIG. 3.

Figure 4:
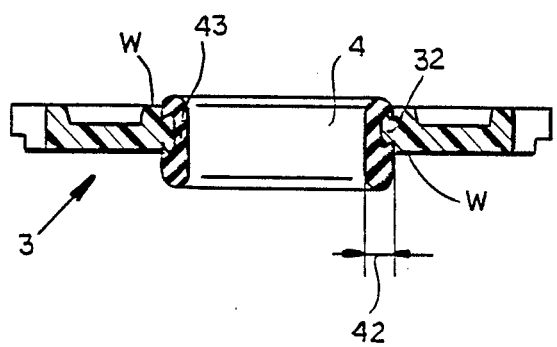
FIG. 4 is a plan view of a base member with a different joint structure similar to FIG. 3.
Figure 5:
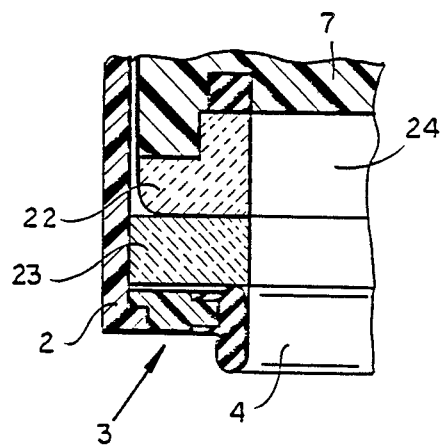
FIG. 5 is a detail section applicable of FIGS. 1–3.

In another embodiment of my invention shown in FIG. 4 the base member 3 has a different joint structure. Thus the passages or openings 31,31',31" in the base member 3 have a peripheral dovetail like shape 32 to which the sealing member 4 is vulcanized. Also in this embodiment the desired hose-like character of the sealing member 4 is retained since the constricted portion 43 similarly is made only about ⅓ of the hose thickness 42. In both embodiments the sealing member 4 is vulcanized to the base member 3. Understandably the sealing member 4 can be combined by an adhesive substance or other suitable attachement means with the base member 3.

I claim:

1. In a water mixing valve with a housing or cartridge insertable in a sanitary fixture, said housing or cartridge comprising a cuplike casing and a base member having a plurality of throughgoing water passages, said water mixing valve having at least one valve seat disk held substantially fixed therein and a control disk movable by an operating member mounted on said valve seat disk and sealing members made from a flexible rubber material positionable in said water passages for providing a seal between said valve seat disk and said sanitary fixture, the improvement wherein each of said sealing members are undetachably attached to said base member in the vicinity of a wall of said base member forming an opening to one of said water passages by means of a plurality of peripheral flanges formed as part of said sealing member on lateral sides thereof arranged so that said flanges surround an inwardly protruding section of said wall.

2. The improvement defined in claim 1 wherein said sealing members and said base member are vulcanized.

3. The improvement defined in claim 1 wherein said wall of said base member has a dovetail shape for holding said sealing member.

4. The improvement defined in claim 1 wherein said sealing member has a constricted portion approximately ⅓ the maximum thickness of said sealing member in the vicinity of said wall of said base member.

5. A water mixing valve with a housing or cartridge insertable in a sanitary fixture with a cuplike casing and a base member having a plurality of throughgoing water passages comprising:

at least one valve seat disk held substantially fixed therein and a control disk movable with the help of an operating member mounted in said valve seat disk; and a sealing member made from a flexible rubber material undetachably attached to said base member with a plurality of extending flanges sunk into lateral sides of said base member in the vicinity of an opening to each of said throughgoing water passages in said base member, said sealing members and said base member being vulcanized to provide a seal between said valve seat disk and said sanitary fixture and said sealing member having a constricted portion approximately ⅓ the maximum thickness of said sealing member in the vicinity of a wall of said base member.

* * * * *